(12) United States Patent
Soave et al.

(10) Patent No.: US 11,987,016 B2
(45) Date of Patent: May 21, 2024

(54) MOLDING DEVICE FOR CASTING AN OPTICAL ARTICLE WITH WAFER ON TOP, CORRESPONDING METHOD AND OPTICAL ARTICLE

(71) Applicant: ESSILOR INTERNATIONAL, Charenton-le-Pont (FR)

(72) Inventors: Pascal Soave, Charenton-le-Pont (FR); Michel Matz, Charenton-le-Pont (FR); Carlos Gonzalez, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 696 days.

(21) Appl. No.: 17/259,008

(22) PCT Filed: Jul. 11, 2019

(86) PCT No.: PCT/EP2019/068745
§ 371 (c)(1),
(2) Date: Jan. 8, 2021

(87) PCT Pub. No.: WO2020/011946
PCT Pub. Date: Jan. 16, 2020

(65) Prior Publication Data
US 2021/0268755 A1    Sep. 2, 2021

(30) Foreign Application Priority Data

Jul. 12, 2018 (EP) .................................... 18183220

(51) Int. Cl.
*B29D 11/00* (2006.01)
*B29C 70/78* (2006.01)

(52) U.S. Cl.
CPC ........ *B29D 11/00528* (2013.01); *B29C 70/78* (2013.01); *B29D 11/00413* (2013.01); *B29D 11/00634* (2013.01); *B29D 11/0073* (2013.01)

(58) Field of Classification Search
CPC ........ B29D 11/00528; B29D 11/00413; B29D 11/00634; B29D 11/0073; B29C 70/78
See application file for complete search history.

(56) References Cited

U.S. PATENT DOCUMENTS

| 4,090,830 A |   | 5/1978 | Laliberte |           |
| 5,286,419 A | * | 2/1994 | van Ligten | B29C 69/02 |
|             |   |        |           | 264/2.6   |

(Continued)

FOREIGN PATENT DOCUMENTS

| CA | 986760  | 4/1976 |
| EP | 2203300 | 7/2010 |

(Continued)

OTHER PUBLICATIONS

Office Action issued in corresponding Japanese Application No. 2021500304, dated Jul. 4, 2023.

(Continued)

*Primary Examiner* — Robert B Davis
(74) *Attorney, Agent, or Firm* — Norton Rose Fulbright US LLP

(57) ABSTRACT

A molding device for casting an optical article with a thermoset resin the optical article defining two opposed main surfaces, one of which being formed by an optical functional wafer, the molding device comprising: —a. a molding element (2) forming a rear or a front part of a casting mold —b. a gasket (3) intended to surround the molding element —c. an initially curved wafer (4) defining a predetermined curvature depending on one of the two main surfaces of the optical article to be molded —d. a closing element (6) defining in a closing position in which the peripheral part of the wafer on the gasket is pinched, a pouring space between the molding element, the gasket and the wafer —e. spacing means (9) interposed between the wafer and the molding element to define an internal volume (Continued)

between the wafer and the closing element, the spacing means, wafer and closing element being configured to form a set hermetic to the resin to be poured into the molding device the closing member occupies a closing position.

12 Claims, 2 Drawing Sheets

(56) References Cited

U.S. PATENT DOCUMENTS

| | | | | |
|---|---|---|---|---|
| 5,883,169 | A | * | 3/1999 | Spector ............... C09D 127/06 524/910 |
| 2001/0028435 | A1 | * | 10/2001 | Evans ............. B29D 11/00019 351/159.56 |
| 2009/0079934 | A1 | | 3/2009 | Su et al. |
| 2009/0091825 | A1 | | 4/2009 | Saito et al. |
| 2010/0141890 | A1 | | 6/2010 | Menta et al. |
| 2017/0329051 | A1 | | 11/2017 | Vu et al. |
| 2019/0346695 | A1 | * | 11/2019 | Shan ...................... G02C 7/104 |

FOREIGN PATENT DOCUMENTS

| | | | | |
|---|---|---|---|---|
| FR | | 2183108 | | 12/1973 |
| JP | | 09258009 A | * | 10/1997 |
| JP | | H 9258009 | | 10/1997 |
| WO | WO-9321010 A1 | * | 10/1993 | ......... B29C 35/0894 |
| WO | WO 2009/098886 | | 8/2009 | |
| WO | WO 2010/073625 | | 7/2010 | |
| WO | WO 2018/052454 | | 3/2018 | |

OTHER PUBLICATIONS

International Search Report and Written Opinion issued in International application No. PCT/EP2019/068745 dated Oct. 14, 2019.

* cited by examiner

MOLDING DEVICE FOR CASTING AN OPTICAL ARTICLE WITH WAFER ON TOP, CORRESPONDING METHOD AND OPTICAL ARTICLE

CROSS-REFERENCE TO RELATED APPLICATIONS

This application is a national phase application under 35 U.S.C. § 371 of International Application No. PCT/EP2019/068745 filed Jul. 11, 2019 which claims priority to EP Application No. 18183220.5 filed Jul. 12, 2018, the entire contents of each disclosure is specifically incorporated by reference herein without disclaimer.

TECHNICAL FIELD

The invention concerns a molding device for casting an optical article with a thermoset resin on one side of a functional wafer, the method of manufacture implemented by said molding device and corresponding optical articles.

More particularly, the invention concerns a molding device, the corresponding method of manufacture and optical articles of the kind having two opposed main surfaces, one of which being formed by an optical functional wafer.

A "functional wafer", or "wafer" or "optically functional wafer" has the aim to impart one or more functional properties to the finished optical article (for example a lens), such as photochromic and/or polarizing properties, when associated to an ophthalmic substrate.

This wafer refers to a film structure formed of either a single film layer or a film laminate structure formed of multiple film layers attached to one another. More precisely, the functional wafer is formed of an ophthalmic-grade functional film or of an ophthalmic-grade functional film (with for example polar or photochromic properties . . . ) and having an ophthalmic-grade protective film on one or both sides of the ophthalmic-grade functional film.

It is either embedded in the lens resin just beneath a front lens surface or incorporated into a front, back, or front and back side of the lens.

Such a wafer can be integrated to an optical lens thanks to different methods of manufacture such as lamination on substrate, association with a thermoplastic injected resin forming a substrate . . . but the present invention is particularly dedicated to optical articles formed from the association of a wafer to a casting resin forming the substrate and to the associated molding device. Depending on the final position of the wafer in the optical article obtained by casting (embedded into the resin or disposed on top and/or back surface of the resin), different drawbacks can be identified from known methods of manufacture and devices.

BACKGROUND OF THE INVENTION AND THEIR DRAWBACKS

When the wafer is embedded in the thickness of the casting resin, the corresponding method of manufacture involves, such as the one described in the French patent FR 2 183 108, a step of positioning a curved wafer into a molding device at a particular height of an elastic gasket, positioning a superior molding part at a particular distance of the wafer, said distance defining the depth at which the wafer will be positioned into the casting resin, and positioning an inferior molding part under the wafer, and putting in place a closing element to close the molding device.

The superior molding element has a precise curvature dedicated to precisely fit to the one of the wafer and to the final curvature of the lens to be manufactured. It is made of glass with a high precision specific curvature.

When the monomer is poured into this molding device, it flows on the both sides of the wafer thanks to apertures formed in one embodiment in the thickness of the wafer, to fill the space between the superior molding element and the wafer on the one hand, and the other hand, to fill the space between the wafer and the inferior molding element.

Since the cured resin comes into contact with the internal surfaces of the superior and inferior molding elements, both of them have to define a specific curvature, and have to be cleaned or if not, disregarded after casting, what renders expensive the manufacture and maintenance costs of said superior and inferior molding elements.

Moreover, the position of the wafer embedded into the substrate and spaced by a thickness of resin from the top surface of the optical article, can damage the functional properties of the wafer. For example, with a wafer functionalized to polarize incident light, the efficiency of polarization of the wafer can be damaged if the thickness of resin through which the light has to pass acts to partially depolarization the incident light.

To avoid such drawbacks, more recent methods proposes molding devices and methods of manufacture in which the wafer is positioned on top and/or back of the optical article.

Such molding device, method of manufacture and optical articles with wafer on top, are known for instance by the document US2017/0329051 filed in the name of Vision Ease. It discloses an ophthalmic lens comprising an optically functional wafer, a layer of a polymerized polyurea-urethane lens resin, and a wafer treatment adhering the optically functional wafer to the layer of the polymerized polyurea-urethane lens resin.

According to a particular embodiment disclosed therein, the functional wafer can be placed on top of the lens manufactured. In this case, the functional lens is formed through a taping process in which a functional wafer is temporarily adhered or attached to a front glass mold or back glass mold, the opposing glass mold being positioned at a desired distance from the wafer and a ribbon of tape is adhered around a perimeter of the assembled components.

The taping process appears compulsory to make the surface of the wafer exactly fit to the specific curvature of the molding element with which it is brought into contact and that will impart its curvature to the corresponding surface of the wafer and of the optical article manufactured.

In this device, the superior molding element is in direct contact with the wafer tapped on its internal surface and not in direct contact with the monomer poured into the cavity of the molding device as in the previous presented prior art.

However, numerous precautions have to be used to obtain a perfect adhesion and fitting of curvature between the wafer and the internal surface of the superior molding element, what is not always guaranteed and/or implies unavoidable set up time.

This prior art also suffers from the drawback that the method of manufacture described therein, requires a compulsory step of wafer treatment to allow its adhesion to the resin once poured and cured.

Moreover, the molding device used for the above described embodiment wherein the wafer is adhered or attached to a front or back glass mold, imposes for the corresponding front or back glass mold, to define an accurate curvature in function of the corresponding outer surface of the lens to be manufactured. This implies automatically the use of an accurate in dimensions and therefore expensive part of a mold of manufacture.

Another document filed in the name of Qspex Technologies EP 2 203 300, discloses a method for manufacturing polarized ophthalmic lenses with wafer on top and comprising the steps of:
(a) providing a front lens mold having a concave surface with a curvature;
(b) spin-coating a hard coat composition onto the concave surface of the front lens mold to form a hard coat layer thereon;
(c) forming a first adhesive layer on the hard coat layer;
(d) placing a polarized film on the adhesive layer;
(e) curing the adhesive layer with UV or visible light to bond the polarized film to the hard coat layer, thereby forming a polarized front lens mold; and
(f) forming a polarized lens with the polarized front lens mold.

The polarized film is formed of polyvinylalcohol PVA or polyethylene terephtalate PET and is protected by a hard coat layer applied on the external surface of the wafer via a UV curable adhesive layer, before a thermoset UV curable resin is poured behind the wafer in a casting mold.

Therefore, this method involves as the one of Vision Ware, a casting mold with front and rear parts that are molding parts of the mold and both requiring particular curvature accuracies since respectively molding the thermoset resin and being in direct and continuous contact with the protected wafer, what automatically implies higher specifications and cost of manufacture.

Moreover, this molding device is specific to UV curable resins, UV curable adhesive layers, what reduces drastically the kind of substrates to be used and optical devices to manufacture and the materials constitutive of the molding elements.

Moreover, the different steps involved to protect the wafer before the casting via a UV curable adhesive and a hardcoat lengthens and enhances the cost of the manufacture method.

Furthermore, the kind of polarized film used, that are sensitive to water, renders compulsory the use of a hardcoat at the early stage of the manufacture of the lens, what implies different drawbacks.

Indeed, in this method, the application of a hard coat before the casting implies an early differenciation via the hardcoat at the very stage of manufacture of the lens, what renders complex and restrictive the method of manufacture.

The invention has the aim to solve the above identified problems with a molding device and manufacture method less expensive, less complex and less restrictive in implementation than prior art.

OBJECT AND SUMMARY OF THE INVENTION

The invention concerns a molding device for casting an optical article with a thermoset resin, the optical article defining two opposed main surfaces, one of which being formed by an optical functional wafer, the molding device comprising:
a. a molding element forming a rear or a front part of a casting mold
b. a gasket intended to surround the periphery of the molding element
c. an initially curved wafer defining a predetermined curvature depending on one of the two main surfaces of the optical article to be manufactured
d. a closing element defining in a closing position in which the peripheral part of the wafer is pinched on the gasket, a pouring space between the molding element, the gasket and the wafer
e. spacing means interposed between the wafer and the closing element to define an internal volume between the wafer and the closing element, the spacing means, wafer and closing element being configured to form a set hermetic to the resin to be poured into the molding device when the closing member occupies a closing position.

The molding device of the invention therefore uses, instead of a molding part of a mold as is done in the prior art, the wafer itself, with a predetermined curvature, as a molding part of the resin, so that there is no more need to provide the molding device with two opposed molding parts with high quality dimension accuracy. Instead, the closing element can have an internal surface with any kind of shape providing it defines a sufficient cavity avoiding any contact between the wafer and the internal surface of the closing element. Since no dimensional accuracy is needed for the closing element, it can be machined and/or made from less quality material such as recycled material. The wafer with a predetermined curvature ensures itself the role of defining an accurate curvature in function of the lens to be manufactured. The wafer that is not into contact with the closing element has not to fit to the curvature of said closing element. The closing element that is never into contact with the monomer/cured resin, has not to be cleaned or disregarded after casting, and can be reused.

The invention shows other advantages according to the following features considered alone or in combination:
the central part of the wafer surrounded by the spacing means is hermetic to the resin to be poured into the molding device
the spacing means are hermetic to the resin to be poured into the molding device
the spacing means comprise a protruding edge intended to be brought into contact with a peripheral part of the wafer, and extending from a main surface of the closing member
the protruding edge and the main surface of the closing element constitute a unique element
the internal surface of the closing element is a non molding surface for the resin
the closing element and the molding element are made from different materials and/or with different curvature accuracies, the curvature accuracy of the molding element being correlated to the curvature of the corresponding surface of the article to be manufacture, the curvature accuracy of the closing element not being correlated to the curvature accuracy of the corresponding surface of the article to be manufacture
the wafer can be constituted by a recycled thermoplastic such as polycarbonate The invention concerns a method of manufacture of an optical article with a thermoset resin, the optical article defining two opposed main surfaces, one of which being formed by an optical functional wafer, the method comprising the step of:
forming a molding device comprising:
a molding element forming a rear or a front part of a casting mold
a gasket surrounding the molding element
a wafer defining a predetermined curvature depending on one of the two main surfaces of the optical article to be molded a closing element applied tightly on the wafer or on a peelable protection layer applied on the wafer spacing means interposed between the wafer and the molding element to define an internal volume between the wafer and the closing element placing the closing element into a closing position wherein the molding element, the gasket and the wafer define a pouring space for the thermoset resin, the spacing means, wafer and closing element being configured to form a set hermetic to the resin to be poured in the pouring space pouring a thermoset resin in the pouring space.

Preferably, the method comprises a preliminary step of dimensioning the curvature of the wafer in function of the curvature of the corresponding surface of the optical article to manufacture Ideally, before the step of forming a molding device, a step of drying the wafer to eliminate humidity.

The invention concerns an optical article defining two opposed main surfaces, one of which being formed by an optical functional wafer, and constituted by a thermoset resin, comprising:

a wafer comprising cellulose acylate-based materials a curable resin defining at least one uppermost surface the wafer being positioned on at least one uppermost surface of the curable resin the uppermost surface of the resin on which the optical functional wafer is positioned, being mingled with a main surface of the functional wafer According to another embodiment, the invention concerns an optical article defining two opposed main surfaces, one of which being formed by an optical functional wafer, and constituted by a thermoset resin, comprising a wafer comprising PVA a curable resin defining at least one uppermost surface, the resin comprising allyl diglycol carbonate or polythiouréthane the wafer being positioned on at least one uppermost surface of the curable resin the uppermost surface of the resin on which the optical functional wafer is positioned, being mingled with a main surface of the functional wafer Preferably, in this case, the wafer comprises cellulose acylate-based materials, cellulose diacetate and/or cellulose tri-acetate.

Ideally, the article comprises a peelable protection layer applied on the outermost surface of the wafer

BRIEF DESCRIPTION OF THE DRAWINGS

These and other aspects, features and advantages of the invention will be apparent and elucidated from the following description of embodiment of the present invention, reference being made to the accompanying drawings, in which.

DESCRIPTION OF ONE EMBODIMENT

Specific embodiments of the invention will now be described with reference to the accompanying drawings.

Figure 1:
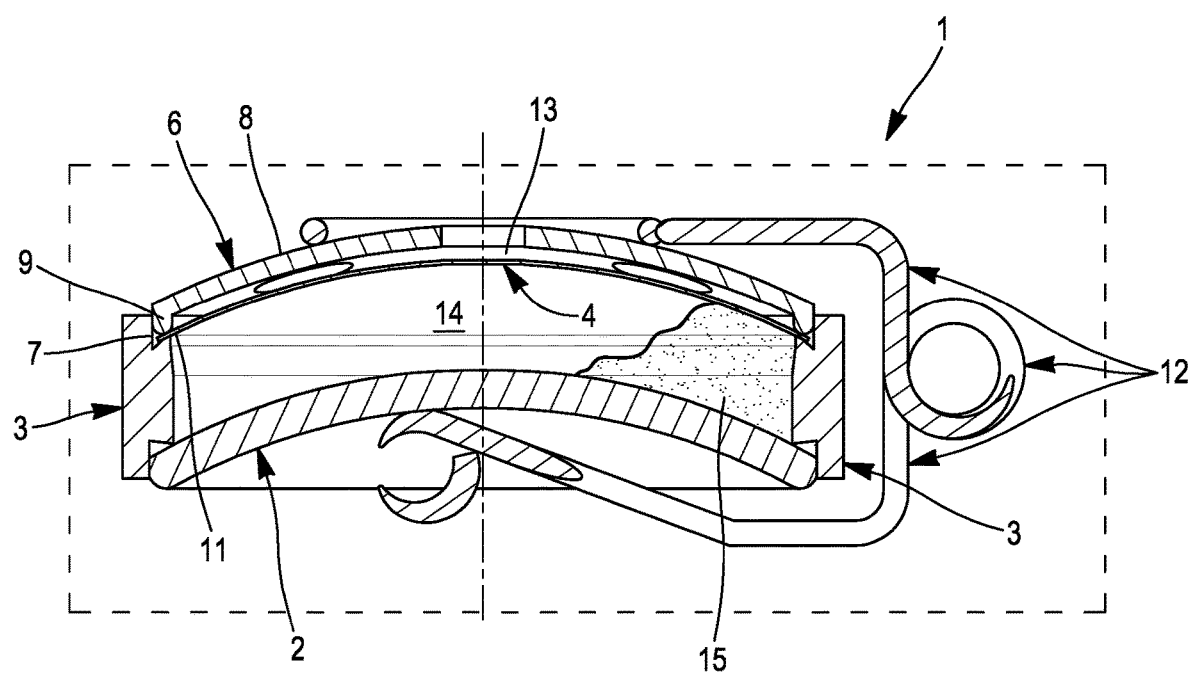
FIG. 1 is a cross-sectional view of an ophthalmic lens according to one embodiment of the present invention.
Figure 2:
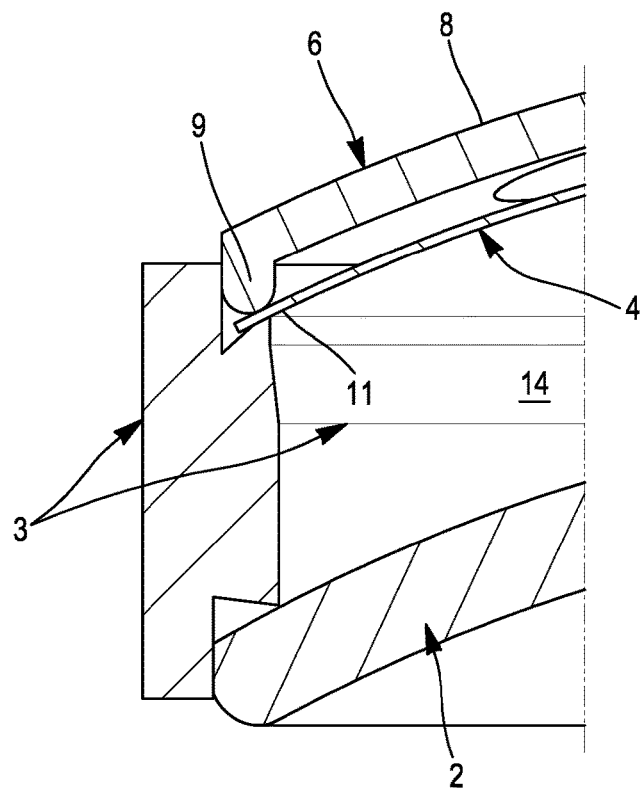
FIG. 2 is an enlargement of the FIG. 1

In the illustrated embodiment of the invention, as shown in FIGS. 1 and 2, a molding device is used for casting an optical article with a thermoset resin, the optical article defining two opposed main surfaces, one of which being formed by an optical functional wafer, each having a predetermined specific curvature $C_{front}$, $C_{rear}$.

In this embodiment, the main surface of the optical article formed by the wafer is the front main surface of the optical article.

In this case, as illustrated on the FIG. 1, the molding device 1 comprises:

a. a molding element 2 forming in the illustrated embodiment of the invention, a rear part of a casting mold b. a gasket 3 intended to surround the molding element 2 c. the said wafer 4 defining a predetermined curvature $C_{wafer}$ depending on the corresponding main surface $C_{front}$ of the optical article to be molded d. a closing element 6 defining in a closing position pinching the peripheral part 7 of the wafer on a corresponding protruding edge 8 the gasket, a pouring space between the molding element 2, the gasket 3 and the wafer 4. More precisely, said closing element 6 constitute a unique element defining a main surface 8 surrounded by an annular protruding edge 9 protruding from the inner face of the main surface 8 of the closing element 6.

As will be evident from the FIG. 2, the spacing means formed by the protruding edge 9 is intended to be brought into contact with a peripheral part of the wafer 4, and extending from a main surface 8 of the closing member 6, to pinch the peripheral part 11 of the wafer 4 on a corresponding part of the gasket 3, when the closing member occupies a closing position.

The protruding edge 9 interposed between the wafer 4 and the main surface 6 of the molding element 6 defines an internal volume between the wafer and the closing element.

The wafer, the gasket and the molding element define a pouring space I which the resin is poured when the closing member occupies a closing position. The spacing means, wafer and closing element are configured to form a set hermetic to the resin.

Once the closing element 6 with its spacing protruding edge 9 is applied on the peripheral part 11 of the wafer 4, and the gasket 3 is interposed between said wafer and the rear molding element 2, a closing clip 12 is put in place to apply a bridging force between the main surface 8 of the closing element 6 and the rear molding element so that the peripheral part 11 of the wafer 4 is tightly pinched between the protruding edge 9 and the corresponding part of the gasket 3 and the molding device is closed forming an inner main cavity 14 (pouring space) into which the resin will be poured.

Means (not illustrated) allow the flow of the liquid resin 15 to be cured in the main inner cavity 14 formed between the wafer 4, gasket 3, rear part of the mold 2, as schematically illustrated on the FIG. 1 with the dots.

In the mean time, since the wafer 4 and the protruding edge 9 are hermetic to the resin, the small upper cavity 13 formed between the wafer 4, the protruding edge 9 and the main surface 8 of the closing element 6 remains free from resin.

Once the resin occupies all the volume of the inner main cavity 14 while the upper small cavity 13 is free from resin, it is cured and solidifies in contact of the wafer and adheres to the latter.

Further to a complete solidification of the resin and to the opening of the molding device, an optical article with a wafer on top of a cured resin adhering thereon is obtained, with predetermined front and rear curvatures.

The closing element 6 that has not to be defined with an accurate curvature/dimension can be manufactured at low cost contrary to any molding part of the molding device (such as in the illustrated example the rear part of the mold that form a molding part for the resin).

For example, the closing element 6 can be provided in the form of a workpiece machined or injected constituted by a material suitable to support temperatures above 100° C. and preferably above 130° C. It could therefore be provided in the form of a metallic machined workpiece (made for example in aluminium). It could also be molded by injection of a suitable thermoplastic.

More preferably, it could be made from recycled wasted thermoplastic in the field of ophthalmic, such as polycarbonate residues coming from the manufacture of polycarbonate lenses.

The closing element that is not brought into contact with the resin/monomer since being part of the set hermetic to the resin/monomer, can be reused indefinitely without any step of cleaning between two casting steps, or without the need of using any gasket of the clean seal type.

Functional Wafer

Curvature Accuracy

According to the invention, the wafer 4 constitutes the sole molding part for the upper part of the resin and is not in contact with the inner face of the closing element 6 throughout the pouring and curing process. Therefore the inner face of the closing element 6 has not to define any particular curvature with any particular dimension accuracy, simply a form allowing any change in the form of the wafer during the process of pouring and curing of the resin without contact between the wafer and the inner face of the closing element 6.

Since it is the sole element imparting its curvature to the upper part of the resin poured and cured into the molding device, the wafer is chosen with an initial particular rigidity or semi-rigidity sufficient to define a particular curvature in function of the curvature of the corresponding surface of the optical article to be manufactured (front surface in the illustrated example).

The curvature of the surface of the optical article to be manufactured confused with the wafer 4 (final curvature) depends on the initial curvature of the wafer 4, on resin pouring and curing conditions.

Experiments accessible to the skilled man could be used to establish with the same resin pouring and curing conditions, and/or the same resin to be poured mass, the correspondence between the final curvature of the optical article on the side of the wafer and the initial curvature of the wafer when introduced in the molding device.

Figure 3:
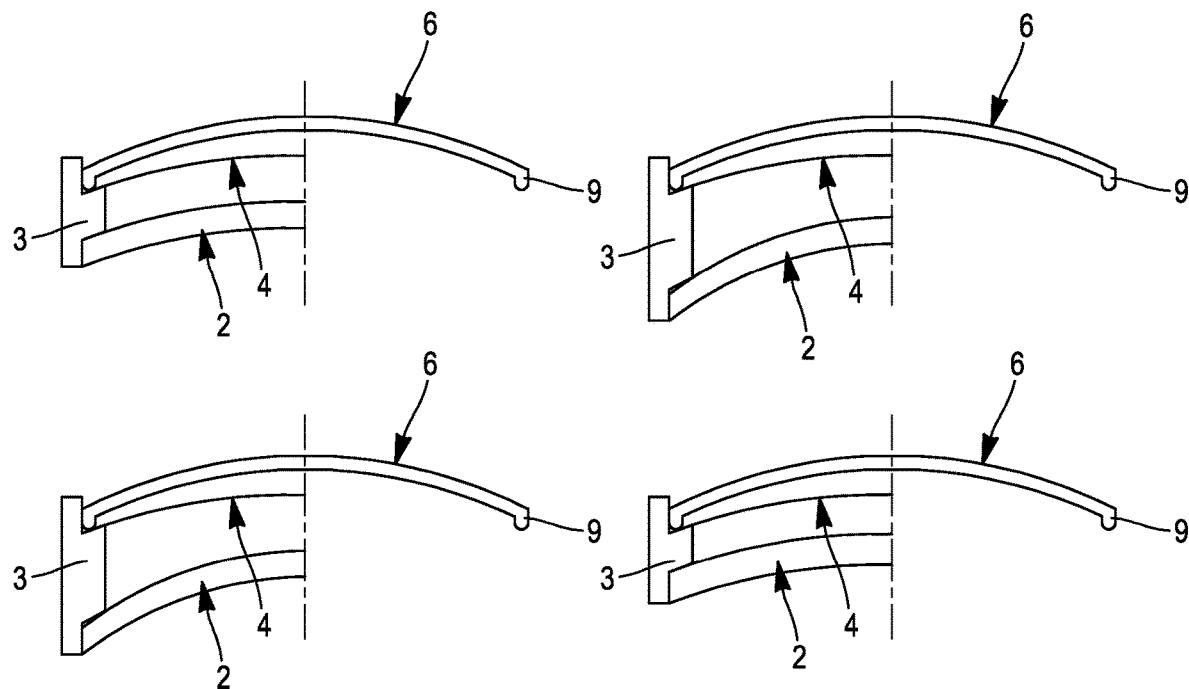
FIG. 3 is cross-sectional views of four embodiments (3a, 3b, 3c, 3d) of the invention allowing the manufacture of lenses different in curvature, thickness and/or size

To this end, as disclosed on the FIG. 3, a set of different semi-rigid wafers of different initial radius of curvature (147.01, 147, 87.22, 104.77 mm), can be used.

Figure 4:
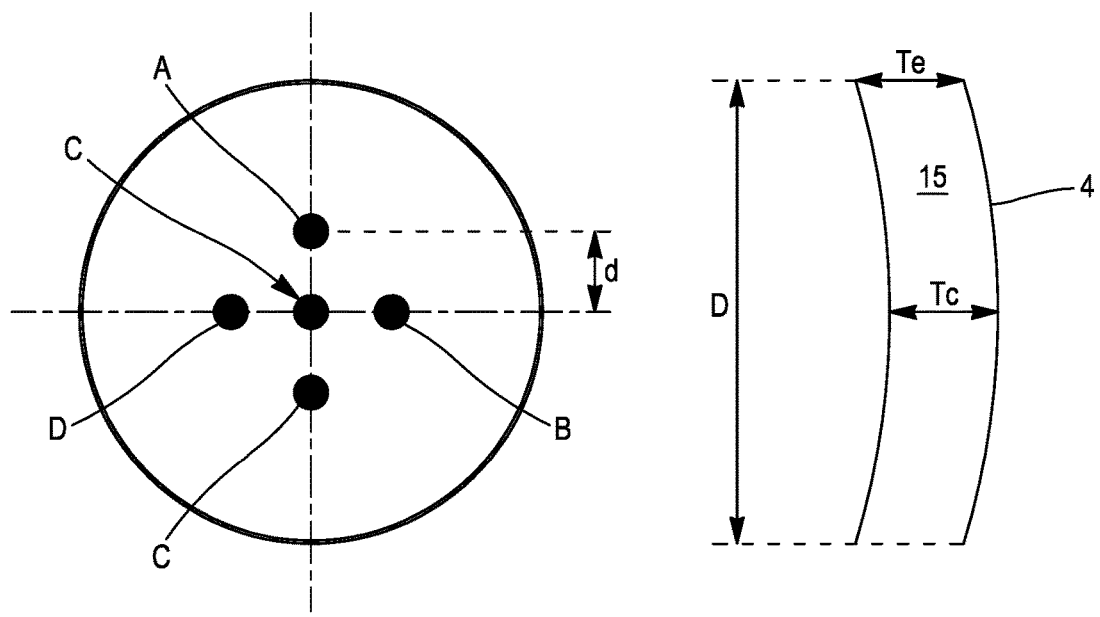
FIG. 4 is a schematic view of control points to measure the diameter D, the thickness at the center Tc and the thickness at the periphery Te of the lens, and to measure front surface curvature at center and on four points at 20 mm of the center of the lens.

And different points of control of the obtained optical article illustrated on the FIG. 4 disposed at the center C and at four points A, B, C, D equidistant from the center of a distance d (20 mm for example) and offset by 90°, can be used to measure the final curvature of the optical article on the side of the wafer.

Also the diameter D, the thickness at the center of the optical article Tc, the thickness at the edge of the optical article Te are used as measurements to control the dimension accuracy of the process.

The wafer with its particular curvature is preferably dried before its introduction into the molding device to ensure to obtain the correct curvature of the corresponding surface of the optical device. To this end, the wafer can be subjected just before its introduction into the mold (or few hours before such as less than 4 hours), to a step of drying into a heat chamber, for example at a temperature above 70° C., 75° C., 80° C., or 85° C. during a drying time of 5, 10, 18, or 20 hours.

Structure of the Wafer

The flat film structure of the wafer can be a single layer of film or a film laminate with a functional layer positioned next to a protective film layer or between two protective film layers.

In certain embodiments of the present invention, the functional layer of the functional wafer has, for example, a thickness in the range of 20 to 700 micrometers, preferably 30 to 600 μm. The protective layer(s) have, for example, a thickness of about of 50 μm.

The protective layer of the functional wafer in front of the closing element 6 can remain during the pouring and curing step whereas the protective layer on the side of the functional layer along which the resin will be poured and cured, if any, is taken off before the wafer is introduced in the mold.

The wafers used are not sensitive to humidity so that they do not need protection such as the use of an hardcoat and/or protection varnish.

Moreover, it is a will and a benefit to delay the incorporation of a particular hardcoat/topcoat well after the manufacture of the resin/wafer set to implement a delayed differentiation, what renders easier the management of the storage of semi-finished articles and/or the addition of particular properties of the optical article such as the tinting later in the process of manufacture.

Chemical Composition

The functional film wafer and/or the protective layers of the film laminate wafer are formed of an ophthalmic-grade transparent resin film or sheet. Suitable transparent resin film or sheet materials include poly(vinyl alcohol) (PVA) or cellulose acylate-based materials include, for example, cellulose diacetate and cellulose triacetate (TAC). Other usable wafer can include polycarbonate, polysulfone, cellulose acetate buturate (CAB), polyacrylate, polyester, polystyrene, copolymers of acrylate and styrene, and poly(vinyl alcohol) (PVA). Polycarbonate-based materials include, for example, polybisphenol-A carbonate; homopolycarbonate such as 1,1'-dihroxydiphenyl-phenylmethylmethane, 1,1'-dihroxydiphenyl-diphenylmethane, 1,1'-dihydroxy-3,3'-dimethyl diphenyl-2,2-propane, their mutual copolymer polycarbonate and copolymer polycarbonate with bisphenol-A.

Functions

The functional wafer according to the present invention provides an optical function such as, for example, coloration, tinting, polarization, photochromism, electrochromism, UV absorption, blue light filtering, mirror, color enhancing and/or narrow band filtering. This wafer could also be an actif film or digital (electrochromic, photovoltaic, connected). Also the wafer could be a protective film hardened in surface, and/or with polarizing, anti-reflective and/or anti-smudge properties.

The wafer starts from a flat film structure, is cut into shapes such as circular, strip or other shapes, and is then thermally formed to a desired base curve. In practice, the wafer may be cut from a flat film structure that, after thermal forming with a particular curvature, results in a wafer having a desired size/curvature or the wafer may be cut from a flat film structure, thermally formed with a particular curvature, and recut to the desired size.

Resin

Any transparent thermoset resin formed from any curable liquid monomer whose polymerization can be thermo or photo activated.

In particular, a diethylene glycol bis(allyl carbonate), such as CR39®, with a refractive index of 1.5, sold by PPG Industries to make thermoset plastics, allylic and (meth) acrylic copolymers, having a refractive index between 1.54 and 1.58, a polythiourethane, such as MR series provided by Mitsui Chemicals: MR6®, MR7®, MR8®, MR10®, MR174®, or even Polycarbonate are suitable materials for substrates, or polyurethane (Trivex®).

Tested Wafer Examples

A polarized TAC wafer composed of triacetate cellulose, stretched PVA and laminated by specific adhesives is bended with a thermal-mechanical technology to a given curvature depending of the desired diopter on the required lens base curve.

More precisely, the specific adhesive was defined as PVOH and/or Glyoxal in order to enhance the correct chemical adhesion without impacting the properties of the polarized element. Also an adequate adhesion in between TAC and CR39 has to be present to allow all the mechanical stress and chemical treatment done during Rx and for this reason a primer with an acrylic base is used. Such a primer can be the one disclosed in WO2018052454.

Tests made were focused to use the following wafer definition:

Ø81 mm, radius tested: 376.57 mm & 147.01 mm
Ø86 mm, radius tested: 205 mm, 140 mm, 104.77 & 87.22 mm For the given example, the curvature of the polarized TAC wafer is fixed between 80 mm and 400 mm, for a desired curvature of the upper surface of the optical article close respectively between 80 mm and 400 mm according material transfer Law. The same curvature as the one of the desired curvature of the upper surface of the optical article is chosen for the wafer (i.e. 80 mm for the wafer when the desired curvature for the upper surface of the optical article is 80 mm).

Wafer conditioning is based on a drying step based on a heat chamber during 18 hrs, 80° C., this is required for the proper adhesion and structure stabilization. Afterwards the TAC wafer is introduced into the casting tools composed of the blocker which is holding the curved wafer with the gasket, finally the back mold is placed prior to have the clip holding all the tools together.

Once the molding device is closed, a curable monomer forming a CR39 resin is poured into the pouring space, without any introduction in the superior space defined between the wafer, the gasket and the closing element.

Once the resin is hardened, while adhering to the wafer, the optical article thus formed is removed from the molding device.

The curvature of the upper surface of the optical article formed by the wafer provided the same surface as a CC molds in terms of optical properties.

The invention claimed is:

1. A molding device for casting an optical article with a thermoset resin, the optical article defining two opposed main surfaces, one of which being formed by an optical functional wafer, the molding device comprising:
   a) a molding element forming a rear or a front part of a casting mold;
   b) a gasket intended to surround the periphery of the molding element;
   c) an initially curved wafer defining a predetermined curvature depending on one of the two main surfaces of the optical article to be manufactured;
   d) a closing element defining in a closing position in which the peripheral part of the wafer on the gasket is pinched, a pouring space between the molding element, the gasket and the wafer; and
   e) spacing means interposed between the wafer and the closing element to define an internal volume between the wafer and the closing element, the spacing means, wafer and closing element being configured to form a set hermetic to the resin to be poured into the molding device when the closing member occupies a closing position.

2. The molding device according to claim 1, wherein the central part of the wafer surrounded by the spacing means is hermetic to the resin to be poured into the molding device.

3. The molding device according to claim 1, wherein the spacing means are hermetic to the resin to be poured into the molding device.

4. The molding device according to claim 1, wherein the spacing means comprise a protruding edge intended to be brought into contact with a peripheral part of the wafer, and extending from a main surface of the closing member.

5. The molding device according to claim 1, wherein the protruding edge and the main surface of the closing element constitute a unique element.

6. The molding device according to claim 1, wherein the internal surface of the closing element is a non-molding surface for the resin.

7. The molding device according to claim 1, wherein the closing element and the molding element are made from different materials and/or with different curvature accuracies, the curvature accuracy of the molding element being correlated to the curvature of the corresponding surface of the article to be manufacture, the curvature accuracy of the closing element not being correlated to the curvature accuracy of the corresponding surface of the article to be manufacture.

8. The molding device according to claim 1, in which the closing member is made from recycled thermoplastic such as polycarbonate.

9. A method of manufacture of an optical article with a thermoset resin, the optical article defining two opposed main surfaces, one of which being formed by an optical functional wafer, the method comprising the step of:
   a) forming a molding device comprising:
      i) a molding element forming a rear or a front part of a casting mold;
      ii) a gasket surrounding the molding element;
      iii) a wafer defining a predetermined curvature depending on one of the two main surfaces of the optical article to be molded;
      iv) a closing element applied tightly on the wafer or on a peelable protection layer applied on the wafer; and
      v) spacing means interposed between the wafer and the molding element to define an internal volume between the wafer and the closing element;
   b) placing the closing element into a closing position wherein the molding element, the gasket and the wafer define a pouring space for the thermoset resin, the spacing means, wafer and closing element being configured to form a set hermetic to the resin to be poured in the pouring space; and
   c) pouring a thermoset resin in the pouring space.

10. The method according to claim 9, comprising a preliminary step of dimensioning the curvature of the wafer in function of the curvature of the corresponding surface of the optical article to manufacture.

11. The method according to claim 9, comprising before the step of forming a molding device, a step of drying the wafer to eliminate humidity.

12. The molding device according to claim 8, in which the recycled thermoplastic is polycarbonate.

* * * * *

UNITED STATES PATENT AND TRADEMARK OFFICE
CERTIFICATE OF CORRECTION

PATENT NO. : 11,987,016 B2
APPLICATION NO. : 17/259008
DATED : May 21, 2024
INVENTOR(S) : Pascal Soave, Michel Matz and Carlos Gonzalez Page 1 of 1

It is certified that error appears in the above-identified patent and that said Letters Patent is hereby corrected as shown below:

In the Claims

<u>Claim 7, Column 10, Line 38:</u>
Delete "manufacture" and replace with -- manufactured --.

<u>Claim 7, Column 10, Line 41:</u>
Delete "manufacture" and replace with -- manufactured --.

Signed and Sealed this
Ninth Day of July, 2024

Katherine Kelly Vidal
*Director of the United States Patent and Trademark Office*